Aug. 20, 1963     D. B. HERRERA     3,101,219
SAFETY BRAKE
Filed Feb. 21, 1961     2 Sheets-Sheet 1
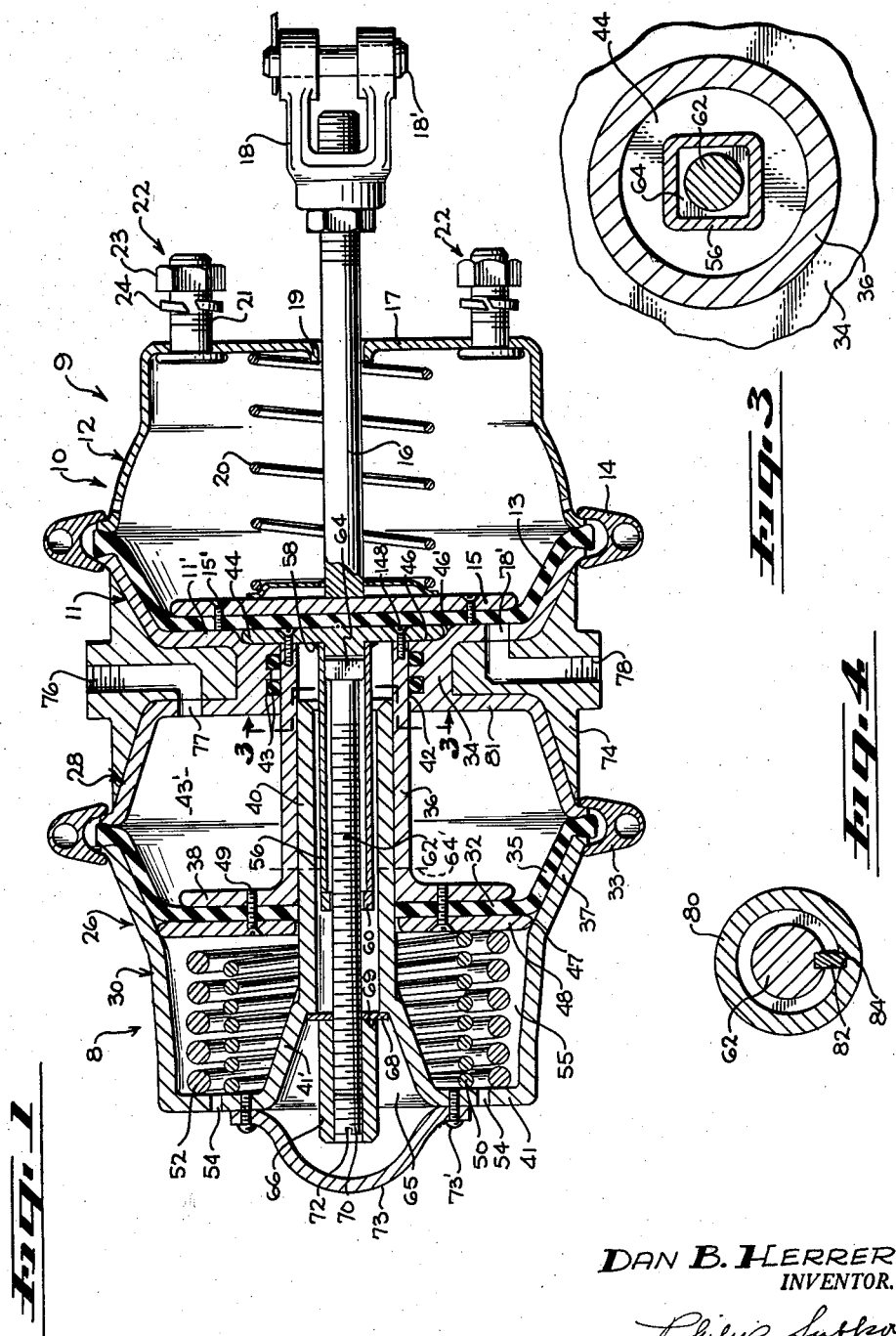
DAN B. HERRERA
INVENTOR.
BY
ATTORNEYS

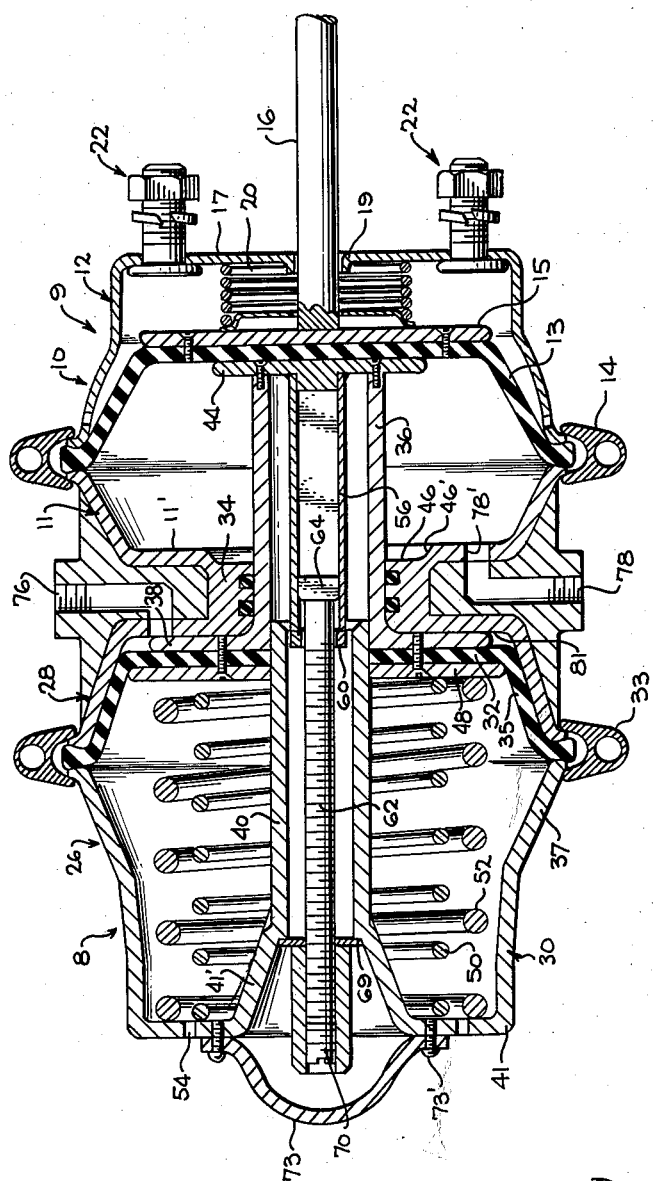

United States Patent Office 3,101,219
Patented Aug. 20, 1963

3,101,219
SAFETY BRAKE
Dan B. Herrera, % Stratovalve and Engineering Co.,
2544 E. 52nd St., Cudahy, Calif.
Filed Feb. 21, 1961, Ser. No. 90,797
13 Claims. (Cl. 303—6)

This invention relates to brake mechanism for vehicles, and more particularly relates to fluid pressure, e.g. air pressure, operated vehicle brakes, incorporating a safety mechanism which does not require fluid pressure for operation and which can be automatically applied as a parking brake and particularly as an emergency brake to provide safe stops in the event of a reduction of fluid pressure.

One object of the invention is the provision of an improved auxiliary brake mechanism employed in conjunction with the conventional brake applying structure.

A further object is to provide a safety mechanism in combination with the conventional fluid pressure brake, which mechanism employs a spring as the actuating means, said spring being normally rendered ineffective by the fluid pressure, but is actuated when the fluid pressure fails or is reduced, and which further incorporates a screw mechanism for readily retracting the safety mechanism after it has been actuated, for resetting such mechanism in its inoperative position.

A still further object is to provide a safety brake mechanism of the type characterized above, which, following actuation, can be readily operated manually for retraction of the screw and resetting.

Yet another object is to afford an improved auxiliary brake structure which is readily constructed, is reliable, durable, and economically competitive.

Other objects and advantages will be apparent hereinafter.

The invention comprises in combination with the conventional fluid pressure operated brake, an automatically operated safety or parking brake mechanism, normally subjected to the same air pressure as employed for operating the brake. This air pressure is sufficient to maintain the auxiliary safety mechanism in its inoperative position. In the event of failure of the compressed air supply or a serious reduction in pressure below a preselected value, a spring mechanism automatically operates to apply the brake and to hold it in the applied position until such time as the air pressure is again built up to its normal amount. When the vehicle is parked and the air pressure is reduced or turned off entirely, the auxiliary mechanism operates automatically to apply the brakes until the air pressure is again brought up to the desired extent. Further, when the vehicle is in operation and moving, if a leakage develops in the fluid pressure line and the air pressure drops below a predetermined minimum, the auxiliary mechanism automatically applies the brake, thus acting as a safety feature.

The auxiliary mechanism comprises a plunger which is actuated in response to motion of a diaphragm produced by a compression spring against one side of the diaphragm. Normally, the same fluid pressure which operates the brake is applied against the other side of said diaphragm and maintains the spring under compression and inoperative. On a reduction or failure of this fluid pressure, the release of the spring causes displacement of the diaphragm and plunger, and movement of the latter cooperates with the conventional brake mechanism including the brake rod, to apply the brake.

An important feature of the invention resides in the incorporation in the auxiliary mechanism, of means for easily and conveniently inactivating and resetting the auxiliary mechanism after it has functioned to apply the brake. According to one embodiment this is accomplished by provision of a screw mechanism which can be actuated manually from one end. Cooperating means are provided on the screw and plunger, so that after the plunger has been urged forward to operate the brake, the screw is manipulated to retract same and simultaneously retracting the plunger and diaphragm of the auxiliary mechanism against the action of the spring, to restore the plunger to its normal inoperative position. Fluid pressure is again applied to the other side of the diaphragm to hold it and the plunger in the inoperative position against the spring. The screw is then adjusted to a position to again permit forward movement of the plunger for actuation of the safety mechanism on reduction of such fluid pressure.

The invention will be more clearly understood by reference to the description below of a preferred embodiment taken in connection with the accompanying drawings wherein FIG. 1 is a longitudinal section through the device, showing the device in its inoperative position;

FIG. 2 is a view similar to FIG. 1, showing the device in its operative position;

FIG. 3 is a section taken on line 3—3 of FIG. 1; and

FIG. 4 shows a modification of a detail of the device.

Referring to the drawings, each of the brake units is formed of two portions, namely the main air brake 9 which is a conventional unit, in combination with the auxiliary unit 8, which incorporates the novel mechanism of the invention. The brake unit 9 comprises an air brake cylinder 10 which is formed of two parts 11 and 12, each part being outwardly flanged to clamp between the flanges of these parts a rubber diaphragm 13. An annular band 14 is crimped over the flange portions of the cylinder parts for securing them in place.

The diaphragm 13 in its normal relaxed position is in the position shown in FIG. 1 wherein it contacts the rear wall portion 11' of the part 11. A brake rod 16 carries at its inner end a plate 15 which is connected to diaphragm 13 by screws 15'. The plate 15 and diaphragm 13 are normally urged to the left, as seen in FIG. 1 by means of a compression spring 20 which is seated at one end against the plate 15 and at the other end against the wall of the front plate 17 of part 12. In this rearwardmost position of the diaphragm 13, it is in a relaxed condition. The brake rod 16 extends through a bearing 19 in front wall 17 and is threadably connected at its forward end to a clevis 18 which is pivoted at 18' on a conventional brake arm (not shown). Displacement of the brake rod 16 to the right as viewed in FIG. 1 will cause a displacement of pin 18' and a consequent rocking motion of the brake arm in a manner as is well understood, to apply the brake. Actuation of the brake is accomplished by the introduction of fluid pressure through inlet 78 and port 78' of wall 11', into the brake cylinder 10, causing displacement of the diaphragm 13 toward the front of the cylinder 10 against the action of the compression spring 20. The diaphragm 13 can be urged to any desired extent toward the front of the cylinder 10 to apply whatever pressure is needed to operate the brake. In its fully distended position the diaphragm 13 takes a forward position indicated in FIG. 2 of the drawing. Fasteners or clamping units 22 are provided on the front wall 17 of the air cylinder 10 for attachment of the unit to the frame of the vehicle. Such units each comprise a threaded bolt 21, a nut 23 and a spring washer 24.

The auxiliary unit 8 is in the form of a cylinder 26 comprising a front part 28 and a rear part 30. The parts 28 and 30 are flanged to clamp therebetween a second rubber diaphragm 32 employing an annular band 33 crimped over the flange portions of the cylinder parts to secure same in place. In the relaxed position of diaphragm 32 the angular side 35 thereof is in abutting relation with a wall portion 37 of the cylinder part 30 as seen in FIG. 1. It is noted that the units 8 and 9 are interconnected by an integral collar 34.

The diaphragm 32 is mounted for axial displacement of a plunger 36 in response to motion of such diaphragm, said plunger being positioned centrally of the diaphragm. The plunger 36 carries at its rear an integral flange 38, the central portion of the diaphragm 32 being clamped between flange 38 and an outer plate 48 by screws 49. A fixed hollow cylindrical guide 40 is mounted centrally within the auxiliary cylinder 26 and is integrally connected to a rearwardly extending outwardly flared conical wall 41' integral with a rear wall portion 41 of the cylindrical part 30. The plunger 36 is mounted for slidable movement on the guide 40, carrying with it during such movement the diaphragm 32 and the plate 48 connected to the opposite side of such diaphragm. Both the diaphragm 32 and plate 48 are centrally apertured to receive the guide 40. The inner surface 42 of the collar 34 serves as a central bearing for the plunger 36 and the O-ring seals 43 are provided in the collar 34 to render the interior 43' of the forward portion 28 of auxiliary cylinder 26 fluid-tight. In the inoperative position of the diaphragm 32 shown in FIG. 1 the outer periphery of the plate 48 cams against the adjacent inner wall of part 30, as indicated at 47, and thus prevents any rearward strain on or bulging of the diaphragm as a result of the introduction of fluid pressure into the interior 43' of cylinder 26, as will be described hereinafter.

In the position shown in FIG. 1, the forward end of the plunger 36 extends just to the forward end of the cylinder 26, that is, to the front end of collar 34. The end of plunger 36 carries a plate 44 which is connected to the plunger by means of screws 148. The plate 44 seats in a recess 46 formed at the inner end of the brake cylinder 10, such recess being provided by the angular neck portion 46' which connects the part 11 of cylinder 10 with the collar 34 of the auxiliary cylinder 26. It will be seen that the plate 44 abuts the central portion of the diaphragm 13 when the latter is in the relaxed non-brake applying position shown in FIG. 1. Hence it will be seen that movement of plunger 36 to the right as viewed in FIG. 1 will cause plate 44 to displace the diaphragm 13 in the same direction against the action of spring 20 to apply a braking force to the brake rod 16. Such movement of the plunger 36 is brought about by the provision of a pair of concentrically arranged compression springs 50 and 52 positioned in the rear portion of the cylinder part 30 and seated between the rear wall 41 of such part and the plate 48. In the normal non-operative position of the auxiliary mechanism shown in FIG. 1, the springs 50 and 52 are maintained under compression by fluid pressure within chamber 43' of the cylinder 26. Holes 54 are provided in the rear wall 41 of the cylinder part 30 to maintain the chamber 55 in which springs 50 and 52 are located, under atmospheric pressure.

A sleeve 56 having a square cross section as seen in FIG. 3, is mounted centrally on the plate 44 by means of welding as at 58, and extends into the cylindrical guide cylinder 40, but spaced from the inside wall thereof. The sleeve 56 carries a collar 60 at its inner end, and a screw 62 is centrally positioned within the sleeve 56 and is received within collar 60 with sufficient clearance to permit axial movement of the screw with respect to the collar. The screw 62 carries a head 64 at its outer end, such head having a square cross section as seen in FIG. 3, and mating with the interior surface contour of the sleeve 56. Hence it is seen that the screw 62 is maintained in non-rotatable position by virtue of the mating of the head 64 with the interior contour of the sleeve 56, thus locking the screw against rotation, the head 64, however, being in axially slidable relation with the interior of the sleeve 56, and thus permitting axial motion of screw 62 with respect to sleeve 56.

An actuating nut 66 is threadably engaged on the outer end of screw 62 and is positioned in the funnel shaped chamber 65 at the outer end of part 26, formed by the outwardly flared conical wall portion 41', with sufficient clearance between nut 66 and the adjacent wall portion 41' to permit manipulation of the nut with the fingers. At its inner end the nut 66 cams against a plate or washer 68 mounted on the screw 62, and which abuts a shoulder 69 formed at the rear surface of the fixed guide member 40. It will be seen that rotation of the nut 66 will cause axial displacement of the screw 62 within the sleeve 56 in one direction or the other, depending on the direction of rotation of the nut. A lock screw 70 is arranged to be threadably received within the nut 66 adjacent the outer end of screw 62. Lock nut 70 functions to maintain the screw in a fixed preselected position without any axial motion or vibration of the screw. Nut 70 can be removed by means of a tool engaged in a notch 72, when it is desired to actuate the nut 66 for setting the screw 62 in a selected axial position. A removable cover 73 is mounted over the outer end of screw 62, and is connected to the end wall 41 of unit 8 by means of screws 73'.

A fitting 74 is positioned around the collar 34 and fits between the adjacent outer walls of the rear part 11 of the brake cylinder 10, and the front part 28 of the auxiliary cylinder 26. A fluid pressure inlet 78 is provided on one side of the fitting 74 for introduction of fluid pressure via port 78' into the rear portion of the brake cylinder 10 and adjacent the rear face of diaphragm 13, and another fluid pressure inlet 76 is provided in the opposite side of the fitting 74 for introduction of fluid pressure via port 77 into the interior 43' at the forward portion 28 of the auxiliary cylinder 26. The fluid pressure inlets 76 and 78 are connected to the same fluid pressure reservoir in the vehicle (not shown). However, the air pressure introduced via inlet 76 to the auxiliary chamber 26 can be operated by means of a manual control in the vehicle cab, independently of the pedal or other control which introduces air pressure into the braking cylinder 10 via inlet 78, for normal operation of the brake.

Thus, in normal operation of the vehicle, the manually operated control for the fluid pressure to the auxiliary cylinder 26 is set by the operator to introduce fluid pressure from the reservoir through inlet 76 into the forward portion of the auxiliary chamber 26, to maintain the diaphragm 32 in its rearward relaxed position shown in FIG. 1 against the action of the springs 50 and 52. Whenever it is desired to apply the brake in normal operation of the vehicle, fluid pressure from the same source is introduced via inlet 78 into the rear portion of the brake chamber 10. This causes displacement of the diaphragm forwardly against the action of spring 20 to apply the desired braking force. On removal of such fluid pressure the diaphragm 13 in the brake cylinder again is urged back to its normal position by the spring 20, also carrying the brake rod 16 to the left to remove braking pressure.

In the event that there is a failure of the air pressure when the operator applies the brake in the usual manner, the reduction of air pressure in chamber 43' in the forward portion of the auxiliary chamber 26 will cause the springs 50 and 52 to expand carrying the diaphragm 32, plunger 36 and plate 44 to the right as shown in FIG. 2. The consequent movement of the plate 44 of the plunger forward into the brake cylinder 10 urges the diaphragm 13 forward against the action of spring 20 thus carrying the brake rod 16 forward and applying braking pressure to the desired extent until the vehicle is brought under control or to a stop. At this point the parts are in the position shown in FIG. 2 of the drawing with the diaphragm 32 of the auxiliary chamber extended to a forward position and the diaphragm 13 of the brake chamber likewise extended to a forward position.

It will be seen that during forward movement of the plunger 36, the sleeve 56 likewise moves in the same direction, carrying the collar 60 to a position adjacent head 64 of the screw. The maximum forward movement of the plunger and diaphragm 32 and consequently diaphragm 13, will occur when the flange 38 strikes the inner surface of the forward wall portion 81 of the part 28.

The brake can now be released simply by the operator's removing cover 73 and the locking nut 72 at the end of screw 62, and turning nut 66 in a direction to retract the screw 62, that is, to produce axial movement of the screw to the left, viewing FIG. 2. It will be seen that after a relatively small amount of such movement of the screw 62 from the position shown in FIG. 2, the head 64 of the screw, engages the collar 60 on sleeve 56, and continued motion of screw 62 to the left carries with it the collar 60, the sleeve 56, plate 44, the plunger 36, the diaphragm 32 and plate 48, against the action of springs 50 and 52. Rearward movement of this unit is continued until the periphery of plate 48 strikes the wall 37 at 47, corresponding to the initial inoperative position of the diaphragm 32, shown in FIG. 1, and rotation of the nut 66 is then discontinued. At this point the screw has been fully retracted to the left, with the head 64 in the dotted line position shown in FIG. 1 at 64'.

Fluid pressure is again introduced via the passage 76 into the forward portion 43' of the auxiliary chamber 26. The nut 66 is then rotated in the opposite direction to cause the screw 62 to move to the right as shown in FIG. 1, carrying head 64 away from the collar 60 toward the plate 44 to the position of the screw and head shown in full lines in FIG. 1. During such movement of the screw and head 64 to the right for resetting, the fluid pressure in 43' maintains the diaphragm 32 in the position shown in FIG. 1, against the action of the springs 50 and 52. The device is now in the initial position shown in FIG. 1 wherein the auxiliary unit is in the inoperative condition.

It will be noted that the axial position of head 64 on the screw 62, with respect to the position of collar 60, can be adjusted to obtain a desired maximum degree of forward displacement of the plunger 36, e.g. shorter than that indicated in FIG. 2. Thus, screw 62 can be manipulated so that head 64 is reset at an intermediate position between its extreme positions shown in full and in dotted lines in FIG. 1. This will provide a shorter stroke for the plunger 36 and associated parts, than that illustrated in FIG. 2, as result of engagement of parts 62 and 64.

In FIG. 4 is shown a modification of the sleeve 56 and head 64 of FIGS. 1 to 3, to permit axial motion of the screw 62, while preventing rotation thereof. In the modification of FIG. 4, the sleeve 80, corresponding to sleeve 56, is of circular cross section, and in place of head 64, the screw 62 carries a key 82 which is adapted to slide in a longitudinally extending groove 84 formed along the inner surface of sleeve 80.

In place of the diaphragm 32 I can employ an equivalent displaceable member such as a piston.

It will be understood that a brake unit of the type described above according to the invention, can be employed for each of the wheels of the vehicle.

It will be recognized that the safety mechanism of the invention, illustrated by the structural unit 8 of the drawing, can be employed in combination with any type of conventional fluid pressure brake, a representative type being illustrated by unit 9 of the drawing. Thus, for example, the safety mechanism 8 of the invention can be employed in association with a conventional air brake unit employing a piston in place of the diaphragm 13 of the unit 9. Further, it will be understood that the unit 8 can be manufactured and sold as a separate unit for mounting in operative association with any type of conventional fluid pressure air brake, in a manner indicated in the drawings.

Although the auxiliary safety mechanism operates automatically in the event of a reduction in air pressure in the main brake cylinder, by further providing a separate hand valve in the vehicle cab for independently controlling the air pressure to the auxiliary chamber 26, the driver of the vehicle can operate this valve at any time to vent the auxiliary chamber 26 so as to operate the auxiliary unit, for example, as a parking brake. This separate hand valve could also be operated to produce extra braking force in the event of low air pressure, and, of course, the device of the invention is particularly valuable in being fully automatic to apply full braking force in the event of a complete loss of air pressure. The invention structure especially permits quick and easy resetting of the auxiliary mechanism to its inoperative position following actuation of such mechanism.

While I have described particular embodiments of my invention, it should be understood that various modifications and adaptations thereof may be made within the spirit of the invention as set forth in the appended claims.

I claim:

1. A brake mechanism comprising a housing, means forming an aperture at one end of said housing, a diaphragm mounted in said housing, a reciprocable member associated with said diaphragm and mounted for axial movement in said housing axially of said diaphragm, said reciprocable member being movable in response to axial motion of said diaphragm, a fixed hollow guide member mounted in said housing coaxially of said diaphragm, said reciprocable member being mounted for slidable movement on said guide member, means receiving an end of said reciprocable member in said aperture for motion of said end of said last named member exteriorly of said housing, means positioned in said housing on one side of said diaphragm and normally biasing said diaphragm in a direction to urge said reciprocable member toward said aperture at said one end of said housing, means for introducing fluid pressure in said housing against the other side of said diaphragm, a screw extending into said hollow guide member and mounted for movement with respect to said reciprocable member along the axis of said diaphragm, an engagement member mounted on said screw, means carried on said reciprocable member for engaging said engagement member, and means including a manually operable member to produce axial motion of said screw.

2. A brake mechanism as defined in claim 1, including cooperating means carried on said reciprocable member and said screw for preventing rotary motion of said screw but permitting axial motion thereof, said manually operable member being a nut mounted on one end of said screw, and a stop member preventing axial motion of said nut along said screw.

3. A brake mechanism comprising a housing, means forming an aperture at one end of said housing, a diaphragm mounted in said housing, a reciprocable member associated with said diaphragm and mounted for axial movement in said housing axially of said diaphragm, said reciprocable member being movable in response to axial motion of said diaphragm, means receiving an end of said reciprocable member in said aperture for motion of said end of said last named member exteriorly of said housing, means positioned in said housing on one side of said diaphragm and normally biasing said diaphragm in a direction to urge said reciprocable member toward said aperture at said one end of said housing, means for introducing fluid pressure in said housing against the other side of said diaphragm, a screw mounted for movement with respect to said reciprocable member along the axis of said diaphragm, an engagement member mounted on said screw, a fixed hollow guide member mounted in said housing coaxially of said diaphram, said reciprocable member being mounted for slidable movement on said guide member, a sleeve positioned within said hollow guide member coaxially of said diaphragm and spaced from said guide member, a connection between said reciprocable member and said sleeve, said screw extending into said sleeve but spaced laterally therefrom, said screw and sleeve being movable axially with respect to each other, an abutment member mounted on said sleeve for engaging said engagement member on said screw, and means including a manually operable member to produce axial motion of said screw.

4. A brake mechanism as defined in claim 3, said connection comprising a plate mounted on said other end of said reciprocable member and positioned exteriorly of said aperture, and including cooperating means between said engagement member and said sleeve for locking said screw against rotary motion but permitting axial motion thereof, and a flange mounted on said reciprocable member and engaging said other side of said diphragm.

5. A brake mechanism as defined in claim 4, said sleeve having a polygonal cross section and said engagement member on said screw having a polygonal cross section mating with the interior polygonal surface of said sleeve, said manually operable member being a nut mounted on the outer end of said screw, and a stop member preventing axial motion of said nut along said screw.

6. An auxiliary brake mechanism comprising a housing, means forming an aperture at one end of said housing, a diaphragm mounted in said housing and spaced from said aperture, a plunger mounted for reciprocating movement in said housing, said plunger being connected adjacent one end to said diaphragm axially thereof, and being movable in response to the motion of said diaphragm, a fixed guide member for guiding the motion of said plunger in an axial direction, said guide member extending axially of said diaphragm, and said diaphragm being centrally apertured to receive said guide member for slidable movement of said diaphragm with respect to said guide member, means receiving the other end of said plunger in said first mentioned aperture for motion of said other end of said plunger exteriorly of said housing, an abutment mounted at said other end of said plunger, and adapted for association with a fluid pressure operated brake, means positioned in said housing on one side of said diaphragm normally biasing said diaphragm toward said first mentioned aperture, a screw mounted axially of said diaphragm within said guide member, an engagement member mounted at one end of said screw, a sleeve positioned about said screw and within said guide member, one end of said sleeve being connected to said abutment, said screw and sleeve being spaced from each other and movable axially with respect to each other, a stop carried on the other end of said sleeve and adapted to engage said engagement member of said screw, means including a member manually operable from the outer end of said housing, to produce axial motion of said screw, and means for introducing pressure fluid into said housing against the other side of said diaphragm.

7. A brake mechanism comprising in combination a first housing, a first diaphragm mounted in said housing, a brake actuating rod associated with said first diaphragm and extending exteriorly of said first housing, said rod being reciprocable to and from a brake applying position, means positioned on one side of said first diaphram normally biasing said first diaphragm in an inoperative position, means for introducing fluid pressure into said first housing against the other side of said first diaphragm, a second housing mounted adjacent said first housing, means forming an aperture at said one end of said first housing and the adjacent end of said second housing, and providing a passage between said first and second housings, a second diaphragm mounted in said second housing, a reciprocable member associated with said second diaphragm and mounted for axial movement in said second housing coaxially of said rod, said reciprocable member being movable in response to axial motion of said second diaphragm, a fixed hollow guide member mounted in said housing coaxially of said diaphragm, said reciprocable member being mounted for slidable movement on said guide member, means receiving said reciprocable member in said passage for motion of an end of said last named member into said first housing, means positioned in said second housing on one side of said second diaphragm, and normally biasing said second diaphragm in a direction to urge said reciprocable member toward one end of said second housing and into said first housing against said first diaphragm, means for introducing fluid pressure into said second housing against the other side of said second diaphragm, a screw extending into said hollow guide member and mounted for movement with respect to said reciprocable member along the axis of said second diaphragm, an engagement member mounted on said screw, means carried on said reciprocable member for engaging said engagement member, and means including a manually operable member to produce axial motion of said screw.

8. A brake mechanism comprising in combination a first housing, a first diaphragm mounted in said housing, a brake actuating rod associated with said first diaphragm and extending exteriorly of said first housing, said rod being reciprocable to and from a brake applying position in response to movement of said diaphragm, means positioned on one side of said first diaphragm normally biasing said first diaphragm in an inoperative position, means for introducing fluid pressure into said first housing against the other side of said first diaphragm, a second housing mounted adjacent one end of said first housing, means forming an aperture at said one end of said first housing and the adjacent end of said second housing, and providing a passage between said first and second housings, a second diaphragm mounted in said second housing and spaced from said passage, a plunger mounted for reciprocating movement in said second housing coaxially of said rod, said plunger being connected adjacent one end to said second diaphragm axially thereof, and being movable in response to the motion of said second diaphragm, a fixed guide member for guiding the motion of said plunger in an axial direction, said guide member extending axially of said second diaphragm, and said second diaphragm being centrally apertured to receive said guide member for slidable movement of said second diaphragm and said plunger with respect to said guide member, means receiving the other end of said plunger in said passage for motion of said other end of said plunger into said first housing, an abutment mounted at said other end of said plunger, one side of said abutment being in contact with said other side of said first diaphragm, means positioned in said second housing on one side of said second diaphragm and normally biasing said second diaphragm toward said passage at the other end of said second housing and normally biasing said abutment against said first diaphragm, a screw mounted axially of said second diaphragm within said guide member, an engagement member mounted at one end of said screw, a sleeve positioned about said screw and within said guide member, one end of said sleeve being connected to said abutment, said screw and sleeve being spaced from each other laterally and movable axially with respect to each other, a stop carried on the other end of said sleeve, said stop engaging said engagement member of said screw on relative movement of said screw with respect to said sleeve, means including a member manually operable from the outer end of said second housing to produce axial motion of said screw, and means for introducing pressure fluid into said second housing against the other side of said second diaphragm.

9. A brake mechanism as defined in claim 8, including cooperating means carried on said sleeve and said screw for preventing rotary motion of said screw but permitting axial motion thereof, said manually operable member being a nut mounted on one end of said screw, and a stop member preventing axial motion of said nut along said screw.

10. A brake mechanism comprising in combination a first housing, a first diaphragm mounted in said housing adjacent one end thereof, a reciprocable brake actuating rod mounted axially in said housing and extending exteriorly of the other end of said first housing, a plate connected to one end of said rod and engaging one side of said first diaphragm, a compression spring seated against said plate and urging said first diaphragm and said rod toward said one end of said first housing, a pressure fluid inlet to said first housing on the other side of said first diaphragm, a second housing mounted adjacent said one end of said first housing, means forming an aperture at said one end of said first housing and the adjacent end of said second housing, and providing a passage between said first and second housings, a second diaphragm mounted in said second housing and spaced from said passage, a hollow plunger mounted for reciprocating movement along the axis of said second diaphragm coaxially of said rod, a flange mounted at one end of said plunger, said second diaphragm being centrally mounted on one side thereof against said flange, said plunger being movable in response to motion of said second diaphragm, a hollow cylindrical guide member, said plunger being mounted for slidable movement of said guide member, a compression spring in driving relation against the other side of said second diaphragm, and urging it toward said passage, bearing means receiving the other end of said plunger in said passage, a plunger plate mounted on said other end of said plunger and positioned within said first housing, one side of said last named plate being positioned against said other side of said first diaphragm, a screw mounted axially of said second diaphragm within said guide member, an engagement member mounted at one end of said screw, a sleeve positioned about said screw and within said guide member, one end of said sleeve being connected to said plunger plate, said screw and sleeve being spaced from each other laterally and movable axially with respect to each other, a stop carried on the other end of said sleeve, said stop engaging said engagement member of said screw on relative movement of said screw and sleeve for a predetermined distance, means including a member manually operable from the other end of said second housing to produce axial motion of said screw, and means for introducing pressure fluid into said second housing against said one side of said second diaphragm.

11. A safety brake comprising a first housing, a first diaphragm mounted in said housing adjacent one end thereof, a reciprocable brake actuating rod mounted axially in said housing and extending exteriorly of the other end of said first housing, a plate connected to one end of said rod and engaging one side of said first diaphragm, a compression spring seated against said plate and said other end of said housing and urging said first diaphragm and said rod toward said one end of said first housing, a pressure fluid inlet to said first housing on the other side of said first diaphragm, a second housing mounted adjacent said one end of said first housing, means forming an aperture at said one end of said first housing and the adjacent end of said second housing, and providing a passage between said first and second housings, a second diaphragm mounted in said second housing and spaced from said passage, a hollow plunger mounted for reciprocating movement along the axis of said second diaphragm coaxially of said rod, a flange mounted at one end of said plunger, said second diaphragm being centrally mounted on one side thereof against said flange, said plunger being movable in response to motion of said second diaphragm, a hollow cylindrical guide member, said plunger being mounted for slidable movement on said guide member, a compression spring in driving relation against the other side of said second diaphragm, and urging it toward said passage, bearing means receiving the other end of said plunger in said passage, a plunger plate mounted on said other end of said plunger and positioned within said first housing, one side of said last named plate being positioned against said other side of said first diaphragm, a fluid seal between the wall of said passage and said plunger, a sleeve having a polygonal cross section mounted centrally on the other side of said last named plunger plate and extending into said guide member, a collar mounted on the other end of said sleeve, a screw mounted axially of said second diaphragm and extending through said collar into said sleeve, said screw being spaced laterally from said sleeve and said sleeve being axially movable with respect to said screw, a head of polygonal shape mounted on said screw within said sleeve, said head mating with and being slidable along the interior polygonal surface of said sleeve and preventing rotary motion of said screw but permitting slidable movement of said screw within said sleeve, said collar on said sleeve abutting said head when said screw is retracted from said sleeve a predetermined amount, a nut mounted on the outer end of said screw, an abutment adjacent said nut and preventing axial movement of said nut on said sleeve but permitting rotation of said nut on said sleeve.

12. A safety brake mechanism as defined in claim 11, including a lock screw threadably received within said nut adjacent the outer end of said screw, to maintain said screw against axial displacement.

13. A brake mechanism comprising a housing, means forming an aperture at one end of said housing, a diaphragm mounted in said housing, a reciprocable member associated with said diaphragm, longitudinally extending guide means in said housing spaced from the wall thereof and mounting said reciprocable member for axial movement in said housing axially of said diaphragm, said reciprocable member being movable in response to motion of said diaphragm, means positioned in said housing on one side of said diaphragm and normally biasing said diaphragm in a direction to urge said reciprocable member toward one end of said housing, means for introducing fluid pressure in said housing against the other side of said diaphragm, a screw mounted for movement with respect to said reciprocable member along the axis of said diaphragm, an engagement member mounted on said screw, means carried on said reciprocable member for engaging said engagement member, and means including a manually operable member to produce axial motion of said screw.

References Cited in the file of this patent

UNITED STATES PATENTS

| | | |
|---|---|---|
| 2,754,805 | Beman | July 17, 1956 |
| 2,992,630 | Leighton et al. | July 18, 1961 |